United States Patent [19]

Monsky et al.

[11] 4,027,437
[45] June 7, 1977

[54] INFLATABLE BUILDING

[75] Inventors: Jeffrey N. Monsky, Louisville; Glen Combs, La Grange, both of Ky.

[73] Assignee: The McMiah Corporation, Louisville, Ky.

[22] Filed: Nov. 26, 1975

[21] Appl. No.: 635,718

[52] U.S. Cl. .................................. 52/2; 47/28 A; 126/270; 174/35 MS

[51] Int. Cl.² ........................................ E04B 1/345

[58] Field of Search ............... 52/2; 126/270, 271; 237/1 A; 47/28.1, 17; 174/35

[56] References Cited

UNITED STATES PATENTS

| | | | |
|---|---|---|---|
| 2,854,014 | 9/1958 | Hasselquist | 52/2 |
| 3,249,682 | 5/1966 | Laing | 126/270 R |
| 3,328,926 | 7/1967 | Reinhard | 52/2 |
| 3,375,321 | 3/1968 | Laing | 126/270 R |
| 3,741,631 | 6/1973 | Laing | 47/28.1 |
| 3,930,344 | 1/1976 | Gahler | 52/2 |

FOREIGN PATENTS OR APPLICATIONS 2,223,158  11/1972  Germany .................... 52/2

Primary Examiner—Price C. Faw, Jr.
Assistant Examiner—Henry Raduazo
Attorney, Agent, or Firm—Harry B. O'Donnell, III

[57] ABSTRACT

This invention provides a novel inflatable building that is particularly adapted for use as a greenhouse and the like. Basically, the novel building provided by the present invention comprises: support frame means including a plurality of spaced-apart upright first frame members having their lower ends anchored to base means and having their upper ends interconnected to a grid formed of plural spaced-apart second frame members; first and second manifold means mounted adjacent to the periphery of the support frame means and each having an inlet and plural outlets, with their inlets being respectively fluid-connected to a source of pressurized fluid through separate first and second control valve means and with the plural outlets of the first manifold means being offset from the plural outlets of the second manifold means; and covering means for covering the support frame means including two groups of plural inflatable hollow tubular members which extend across the frame means generally parallel to one another, with all members of one of the groups being substantially opaque and fluid-connected to the outlets of the first manifold means and all members of the other one of the groups being substanially translucent and fluid-connected to the outlets of the second manifold means and with one member of each of the groups being located contiguous to one member of the other of the groups such that the amount of light that can be transmitted through said covering means can be selectively varied through operation of the valve means.

10 Claims, 5 Drawing Figures

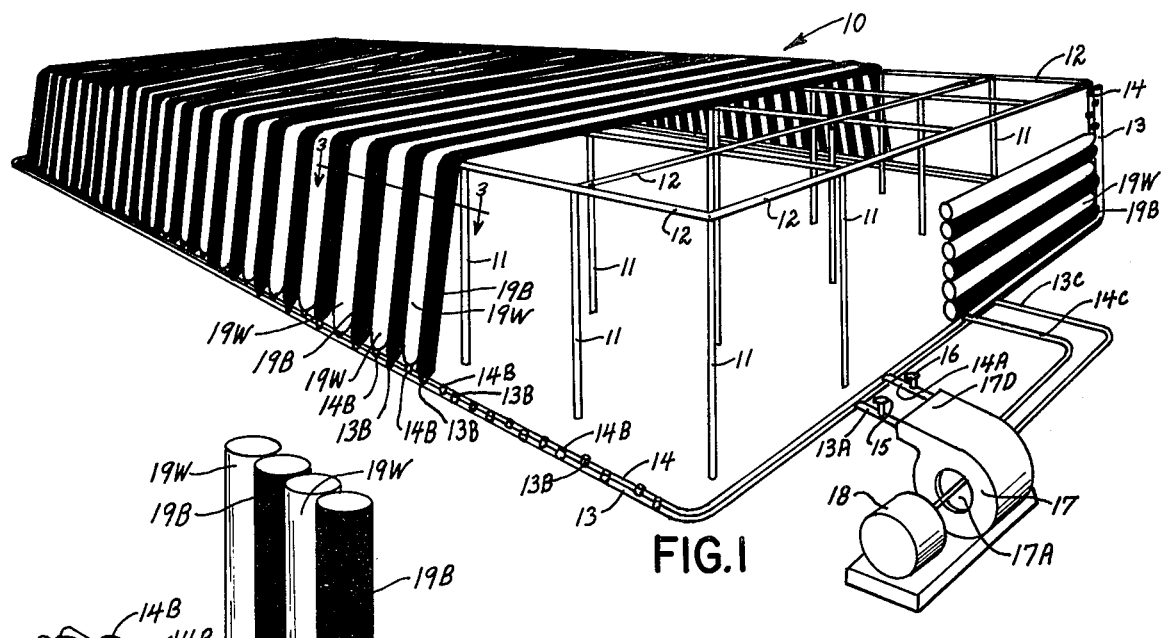

4,027,437

INFLATABLE BUILDING

BACKGROUND OF THE INVENTION

This invention relates to buildings and, more particularly, to a novel inflatable building that is particularly adapted for use as a greenhouse and the like.

In the past, there have been inflatable buildings which have been particularly adapted for use as greenhouses and the like. A typical form of such a prior-art building is described in detail in U.S. Pat. Nos. 3,328,926, wherein there is provided a building which employs rigid frame means that is constructed of a metallic material to provide a plurality of compartments that contain inflatable air bags which are inflated from a single manifold that is connected through single control valve means to a source of pressurized air, with some of the inflatable bags being substantially translucent and others of them being substantially opaque. However, with such prior-art buildings the amount of light which can be transmitted through their covering means can be varied only by varying the relative numbers of the substantially translucent and substantially opaque inflatable bags that comprise their covering means.

And, various prior-art structures, such as those described in detail in U.S. Pat. Nos. 3,249,682; 3,375,321; and 3,741,631, have been provided for varying the amount of light which can be transmitted through inflatable covering means for buildings. However, these prior-art structures have all employed inflatable members of rather complex and, hence, expensive construction, wherein one portion of each such inflatable member was substantially translucent and another portion of each such inflatable member was substantially opaque.

In this era of vastly expanding population and concurrent decreasing supplies of both food and fossil energy supplies there is a great demand for greenhouses. And, the present invention is directed toward providing a novel building structure that is particularly adapted for use as a greenhouse and the like and which is greatly improved and simplified both in construction and operation when compared to the aforedescribed old buildings.

SUMMARY OF THE INVENTION

The present invention provides a novel inflatable building that is particularly adapted for use as a greenhouse and the like. Basically, the novel building provided by the present invention comprises: support frame means including a plurality of spaced-apart upright first frame members having their lower ends anchored to base means and having their upper ends interconnected to a grid formed of plural spaced-apart second frame members; first and second manifold means mounted adjacent to the periphery of the support frame means and each having an inlet and plural outlets, with their inlets being respectively fluid-connected to a source of pressurized fluid through separate first and second control valve means and with the plural outlets of the first manifold means being offset from the plural outlets of the second manifold means; and covering means for covering the support frame means including two groups of plural inflatable hollow tubular members which extend across the frame means generally parallel to one another, with the members of a first one of the groups being substantially opaque and fluid-connected to the outlets of the first manifold means and the members of a second one of the groups being substantially translucent and fluid-connected to the outlets of the second manifold means and with one member of each of the groups being located contiguous to one member of the other of the groups such that the amount of light that can be transmitted through said covering means can be selectively varied through operation of the valve means.

Preferably, the building frame members are made of a material such as a heavy gauge plastic that has excellent strength, flexibility and memory (e.g. polyvinylchloride) and the inflatable tubular members which form the covering means for the building frame means are made of a thin gauge plastic material with the substantially opaque first group of inflatable members covering one-half of the total area covered by the covering means and with the substantially translucent second group of the inflatable members covering the other one-half of the total area covered by the covering means when both of the groups are equally inflated. And, the first and second control valve means are so connected to the source of pressurized fluid and the first and second manifold means so that closure of the first valve means and opening of the second valve means will admit more pressurized fluid into the second group of inflatable tubular members than will be admitted into the first group of inflatable tubular members such that the members of the second group will be more fully inflated than those of the first group and a greater amount of light can be transmitted through the covering means and so that opening of the first control valve means and closure of the second valve means will admit more pressurized fluid into the first group of inflatable members than will be admitted into the second group of inflatable members such that the members of the first group will be more inflated than those of the second group and a lesser amount of light can be transmitted through the covering means. It is also desirable that the pressurized fluid be air and that the frame members be made of a flexible resilient material.

BRIEF DESCRIPTION OF THE DRAWING

The present invention is illustrated in the accompanying drawing, wherein:

FIG. 1 is a fragmentary, somewhat schematic, elevational perspective view illustrating one presently preferred form of a novel inflatable building that is provided in accordance with the present invention;

FIG. 2 is an enlarged fragmentary view of a portion of the building illustrated in FIG. 1 and shows in detail the construction of a portion of its two manifold means and the respective connections thereto of the two groups of plural inflatable hollow tubular members which form the covering means for the support frame means of the building; and FIGS. 3A – 3C are greatly enlarged, fragmentary sectional views taken along line 3—3 of FIG. 1 and illustrate the selectively variable inflation of the cover means tubular members through operation of its first and second control valve means and the resultant selective variation of the amount of light that can be transmitted through the cover means which can be achieved thereby.

DETAILED DESCRIPTION

Turning now to the drawing, and, more particularly, to FIGS. 1 and 2 thereof, there is illustrated one presently preferred form of a novel inflatable building 10 that is provided in accordance with the present invention.

As shown in FIGS. 1 and 2 of the drawing, the novel inflatable building 10 of the present invention comprises support frame means which include a plurality of spaced-apart upright first frame members 11 that have their lower ends anchored, as by poured concrete, to base means, such as earth or the like, and which have their upper ends interconnected to a grid formed of plural spaced-apart second frame members 12. Preferably, both the first 11 and second 12 support frame members are constructed of a flexible resilient material possessed of excellent strength and memory, such as heavy gauge plastic pipe made of polyvinylchloride or the like. While, in the illustrated embodiment, the second support frame members 12 are shown as being horizontally arranged, it should be understood that their arrangement might be otherwise, e.g. arched, etc., and that the upright first support frame members 11 need not necessarily be vertically arranged but might be somewhat slanted with respect to the vertical, without departing from the spirit of the present invention.

As further illustrated in FIGS. 1 and 2 of the drawing, the novel inflatable building 10 of the present invention also includes separate first 13 and second 14 manifold means that are mounted adjacent to the periphery of the support frame means which is formed by the frame members 11 and 12. The first manifold means 13 has an inlet 13A and plural outlets 13B, and the second manifold means 14 has an inlet 14A and plural outlets 14B. And, in particular accordance with the present invention, the plural outlets 13B of the first manifold means 13 are offset from the plural outlets 14B of the second manifold means 14.

As further shown in FIGS. 1 and 2 of the drawing, the inlets 13A and 14A of the two separate manifold means 13 and 14 are respectively fluid-connected through separate first 15 and second 16 control valve means to a source of pressurized fluid, such as the casing outlet 17D of a centrifugal blower 17 of a well-known construction that is powered by drive means, such as the illustrated rotary motor 18, and has a pair of inlets on opposite sides of its casing, one of which 17A is free to receive air and the other of which (not clearly shown) is fluid-connected to the first 13 and second 14 manifold means by return conduits 13C and 14C, respectively.

While it should be understood that various materials of construction might be utilized for the two manifold means 13 and 14, good results have been achieved by also employing heavy gauge polyvinylchloride pipe therefor. And, while various other means might also be employed for the two separate control valve means 15 and 16 that are respecively provided between the source of pressurized fluid 17D and the inlets 13A and 14A of the two separate first 13 and second 14 manifold means, good results can be obtained by using a pair of manually operable needle valves of a well-known construction for that purpose.

As still further shown in all of the FIGURES of the drawing, the novel inflatable building 10 of the present invention further comprises covering means for covering the support frame means and, in particular accordance with the present invention, these covering means include two groups of plural inflatable hollow tubular members 19B and 19W that extend across the sides and top of the support frame means generally parallel to one another, with all of the members 19B of one of the two groups 19B and 19W being substantially opaque and fluid-connected to the outlets 13B of the first manifold means 13, as by fastener means such as the bands 20 shown in detail in FIG. 2, and all of the members 19W of the other one of the two groups 19B and 19W being substantially translucent and fluid-connected to the outlets 14B of the second manifold means 14 by fastener means (such as the aforenoted bands 20) and with one member of each of the two groups 19B and 19W being located contiguous to one member of the other of the two groups 19B and 19W such that the amount of light that can be transmitted through the covering means can be selectively varied through operation of the valve means 15 and 16.

As yet further shown in drawing FIGS. 1 and 3A–C, the hollow inflatable tubular members which respectively form the substantially opaque first group of the covering means members 19B and the substantially translucent second group of the covering means members 19W for the support frame means of the building 10 are preferably comprised of tubes having an elliptical cross-sectional shape and being formed of a thin gauge but highly impervious plastic tubing, such as polyethylene tubing.

As even further shown in drawing FIGS. 1 and 3A–C, the plural inflatable tubular members 19B and 19W which comprise the covering means for the support frame means of the building 10 are extended across the sides and top of the support frame means that is formed by the support frame members 11 and 12 with the long axis of the elliptical cross-section of each being arranged generally perpendicular to the side or top of the support frame across which it extends and with these contiguously arranged inflatable members 19B and 19W being staggered such that every other contiguous one is, respectively, a substantially opaque member 19B and a substantially translucent member 19W.

And, as best shown in drawing FIG. 3A, the sizing of the inflatable tubular members 19B and 19W, the source of pressurized fluid, such as the centrifugal blower 17, the two separate manifold means 13 and 14, the two separate control valves 15 and 16, and the two return conduits 13C and 14C, is arranged such that, when the drive means motor 18 for the blower 17 is energized and the two control valves 15 and 16 are each half-opened (and also, consequently, half-closed) all of the inflatable tubular members 19B and 19W will be equally inflated with each of the contiguous ones thereof being held tightly against one another by the force of the pressurized fluid contained therein.

When in the just-described operating condition shown in drawing FIG. 3A (both groups of the inflatable tubular members 19B and 19W equally inflated), a certain amount of light (e.g. one-half of the desired amount) can be transmitted through the covering means for the building 10 that is formed thereby. The light to be transmitted can, of course, be sunlight from outside of the building and into the same or artificial light from within the building to the exterior thereof, etc.

However, in particular accordance with the present invention, and as best illustrated in drawing FIGS. 3B and 3C, the amount of light that can be transmitted through the covering means that is comprised of the two groups of inflatable tubular members 19B and 19W can be quickly and easily selectively varied through operation of the separate control valve means 15 and 16 that are provided between the source of the pressurized fluid 17D and the inlets 13A and 14A of the two separate manifold means 13 and 14 to which the two groups 19B and 19W of the inflatable tubular members that comprise the building covering means are respectively fluid-connected.

As best shown in drawing FIG. 3B, closure of the first control valve means 15 and opening of the second control valve means 16 will admit more pressurized fluid into the second group of inflatable tubular members 19W than will be admitted into the first group of inflatable tubular members such that the members 19W of the substantially translucent second group will be more fully inflated than those of the substantially opaque first group 19B and more of the surface area that is covered by the covering means will be covered by the substantially translucent second group 19W of inflatable tube members than will be covered by the substantially opaque first group 19B of inflatable tubular members and, consequently, a greater amount of light can be transmitted through the covering means than in the aforedescribed operating condition illustrated in FIGURE 3A.

And, as further best shown in drawing FIG. 3C, opening of the first control valve means 15 and closure of the second control valve means 16 will admit more pressurized fluid into the first group of inflatable tubular members 19B than will be admitted into the second group of inflatable tubular members 19W such that the members 19B of the substantially opaque first group will be more fully inflated than those of the substantially translucent second group 19W and more of the surface area that is covered by the covering means will be covered by the substantially opaque first group 19B of inflatable tube members than will be covered by the substantially translucent second group 19W of inflatable tubular members and, consequently, a lesser amount of light can be transmitted through the covering means than in the aforedescribed two operating conditions illustrated in FIGS. 3A and 3B.

It should be carefully noted, however, that, in any of the aforedescribed three operating conditions, the contiguous ones of the inflatable tubular members 19B and 19W will be held tightly against one another by the force of the pressurized air contained therein, such that there will be no opening between them. However, it should be apparent, that such openings between contiguous ones of the inflatable tubular members 19B and 19W can be caused to occur, if desired, merely by de-energizing the drive means motor 18 for the blower 17 and thus causing deflation of all of the tubular members 19B and 19W which comprise the covering means for the support frame means of the building 10. And, this might advantageously be done in order to permit the passage of wind, rain, fresh air, etc. through the covering means and into the building area covered thereby, when and if so desired.

From the foregoing description, it should be apparent that the present invention provides a novel building structure 10 that is particularly adapted for use as a greenhouse and the like and is simplified both in construction and operation when compared to prior-art structures which have been provided for such purposes. The amount of light which can be transmitted through its covering means can be readily and quickly selectively adjusted through a wide range merely by selectively varying the opening and closure of the two separate control valve means 15 and 16 that are provided between its source of pressurized fluid 17D and the two inlets 13A and 14A of the two separate manifold means 13 and 14 to which the two groups of inflatable tubular members 19B and 19W which form the covering means are fluid-connected. Furthermore, the construction of the support frame means for the building 10 of support frame members 11 and 12 that are made of a flexible resilient material, coupled with the use of covering means therefor which comprise the inflatable tubular members 19B and 19W, permits the building 10 to "bend with the wind" and thus mitigate damage to it thereby.

It should be apparent that while there has been described herein what is presently considered to be a presently preferred embodiment of the present invention in accordance with the Patent Statutes, changes may be made in the disclosed structure without departing from the true spirit and scope of this invention. It is, therefore, intended that the appended claims shall cover such modifications and applications that may not depart from the true spirit and scope of this present invention.

What is claimed is:
1. A building comprising:
   a. support frame means including a plurality of spaced-apart upright first frame means having their lower ends anchored to base means and having their upper ends interconnected to a grid formed of plural spced-apart second frame members;
   b. first and second manifold means mounted adjacent to the periphery of said support frame means and each having an inlet and plural outlets, with their inlets being respectively fluid-connected to a source of pressurized fluid through separate first and second control valve means and with the plural outlets of said first manifold means being offset from the plural outlets of the second manifold means; and
   c. covering means for covering said support frame means including two groups of plural inflatable hollow tubular members which extend across said frame means generally parallel to one another, with all members of a first group of said two groups being substantially opaque about their entire tubular peripheries and fluid-connected to the outlets of said first manifold means and all members of a second group of said two groups being substantially translucent and fluid-connected to the outlets of said second manifold means and with one member of each of said groups being located contiguous to one member of the other of said groups such that the amount of light that can be transmitted through said covering means can be selectively varied through operation of said valve means.

2. The invention of claim 1, wherein closure of said first valve means and opening of said second valve means will admit more pressurized fluid into said second group of inflatable tubular members than will be admitted into said first group of inflatable tubular members such that the members of said second group will be more fully inflated than those of said first group and a greater amount of light can be transmitted through said covering means.

3. The invention of claim 2, wherein opening of said first valve means and closure of said second valve means will admit more pressurized fluid into said first group of inflatable members than will be admitted into said second group of inflatable members such that the members of said first group will be more inflated than those of said second group and a lesser amount of light can be transmitted through said covering means.

4. The invention of claim 3, wherein each of said groups of inflatable members covers one-half of the total area covered by said covering means when both of said groups are equally inflated.

5. The invention of claim 2, wherein each of said groups of inflatable members covers one-half of the total area covered by said covering means when both of said groups are equally inflated.

6. The invention of claim 1, wherein each of said groups of inflatable members covers one-half of the total area covered by said covering means when both of said groups are equally inflated.

7. The invention of claim 1, wherein opening of said first valve means and closure of said second valve means will admit more pressurized fluid into said first group of inflatable members than will be admitted into said second group of inflatable members such that the members of said first group will be more inflated than those of said second group and a lesser amount of light can be transmitted through said covering means.

8. The invention of claim 7, wherein each of said groups of inflatable members covers one-half of the total area covered by said covering means when both of said groups are equally inflated.

9. The invention of claim 1, wherein said pressurized fluid comprises air.

10. The invention of claim 1, wherein said frame members are made of a flexible resilient material.

* * * * *